INVENTORS
ROBERT E. SMITH
JOHN M. WUERTH
ROBERT B. HORSFALL JR.
SYDNEY J. GOLDBERG
THEODORE N. LEINE

BY *William R. Lane*
ATTORNEY

INVENTORS
ROBERT E. SMITH
JOHN M. WUERTH
ROBERT B. HORSFALL JR.
SYDNEY J. GOLDBERG
THEODORE N. LEINE

BY William R. Lane
ATTORNEY 2,713,266

DIFFERENTIAL ALTIMETER

Robert E. Smith, Downey, John M. Wuerth and Robert Bruce Horsfall, Jr., Whittier, Sydney J. Goldberg, Los Angeles, and Theodore N. Leine, Inglewood, Calif., assignors, by mesne assignments, to the United States of America as represented by the United States Atomic Energy Commission Application August 26, 1950, Serial No. 181,594

9 Claims. (Cl. 73—386)

This invention pertains to pressure altitude measuring devices and particularly to a device for measuring predetermined increments of pressure altitude.

It is an object of this invention to provide a device for measuring relatively small differences in altitude over a predetermined short time.

It is another object of this invention to provide an altitude difference measuring device of high accuracy.

It is another object of this invention to provide an altitude difference measuring device having an output in electrical form.

It is another object of this invention to provide a null type altitude difference measuring instrument in which the reference pressure altitude may be arbitrarily set at any predetermined value.

It is a further object of this invention to provide an altitude difference measuring device which may be set to measure starting at any reference altitude.

It is a further object of this invention to provide an altitude difference measuring device in which a sample mass of gas determined by a reference volume at the reference pressure is isothermally transferred to a pressure corresponding to the changed altitude, the resultant volume change being used as an indication of the change in pressure altitude.

Other objects of invention will become apparent from the following description taken in connection with the accompanying drawings, in which Fig. 1 is a sectional plan view of the invention;

Figure 5:
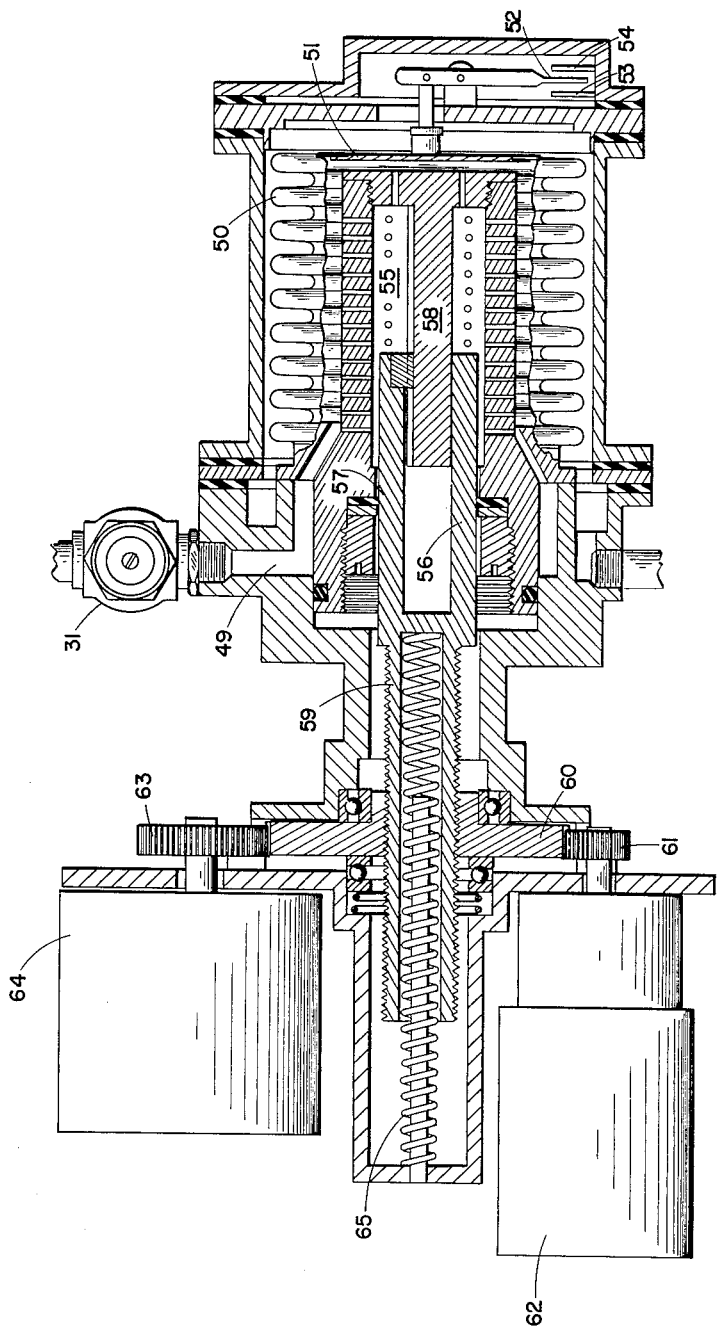

And Fig. 5 is a sectional view of a modified form of the invention.

Figure 1:
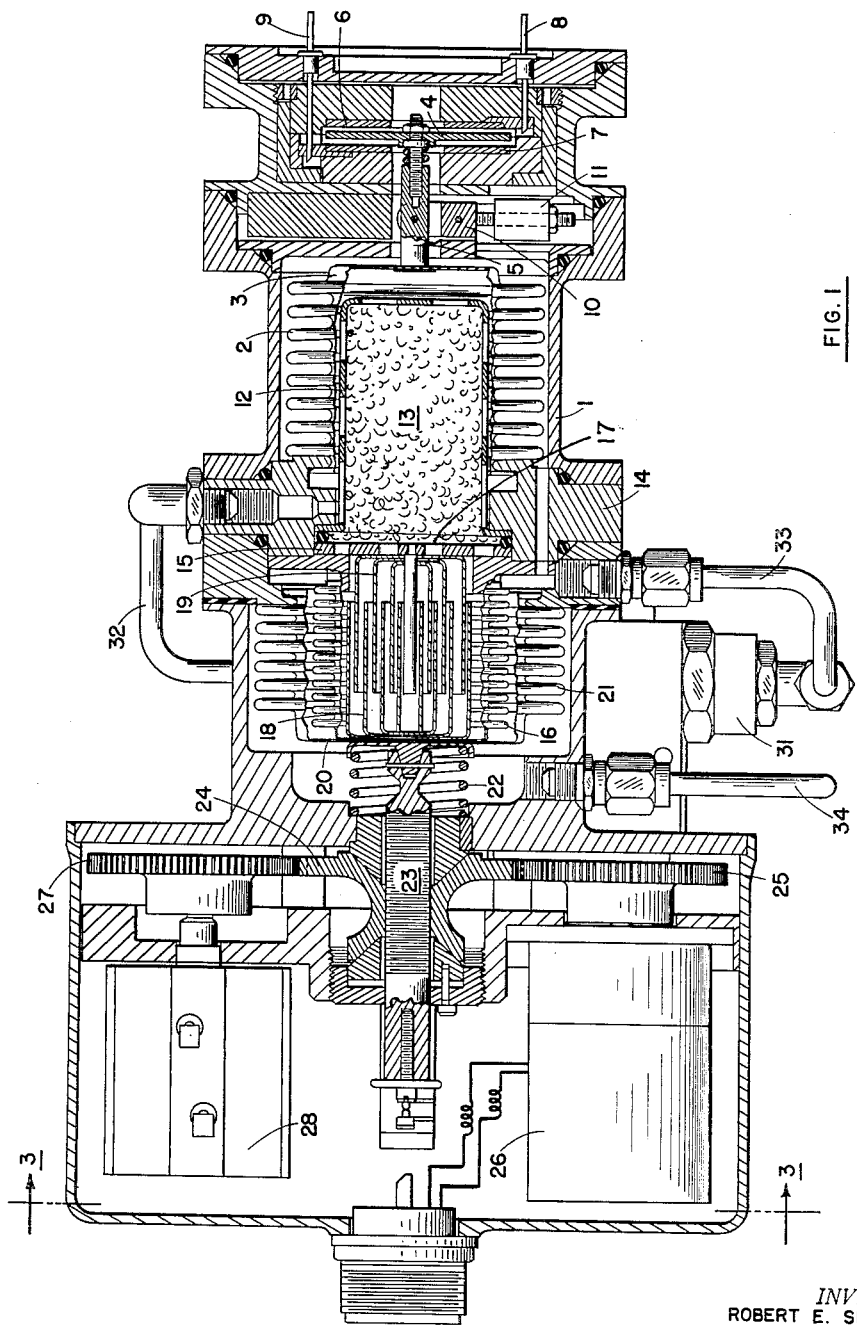
Figure 2:
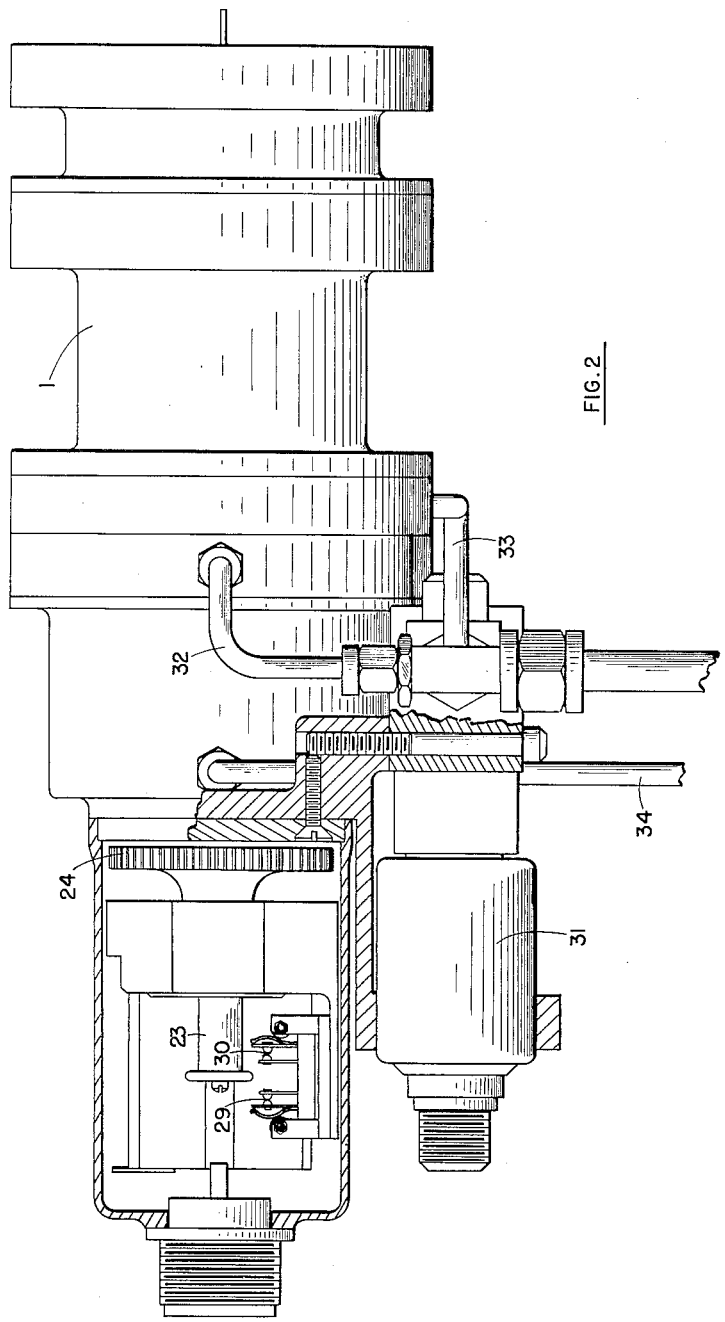
Fig. 2 is an elevational view of the invention.

Referring to the drawings, and particularly to Fig. 1, a gas tight case 1 encloses a sensitive bellows 2 having a bellows head 3 to which is connected a capacitor plate 4 by means of connecting rod 5. Capacitor plate 4 is centered between fixed capacitor plates 6 and 7 to which are connected terminals 8 and 9. Connecting rod 5 is pivotally connected to lever 10 to which is attached adjustable counterweight 11. The cavity of sensitive bellows 2 contains perforated cup 12 which in turn contains metal shavings or screening 13 for a purpose to be hereinafter disclosed. Sensitive bellows 2 is anchored to retaining collar 14 in turn secured to casing 1. Bulkhead 15 separates the interior of sensitive bellows 2 from the interior of bellows 16, but the passage of gas from one bellows to the other is permitted by holes 17 in bulkhead 15. Within bellows 16 are two sets of nested cups 18 and 19. These cups are of copper or some other good heat conductor and are so chosen in their respective diameters as to fit together as shown in Fig. 1, with one set attached rigidly to bulkhead 15 and the other set attached to bellows head 20 of bellows 16. Bellows head 20 also serves as a bellows head for outer bellows 21 and is restrained by the action of spring 22, the other end of bellows 21 being secured to casing 1. Rigidly attached to bellows head 20 in a manner calculated to allow longitudinal movement of the bellows head without twisting it is screw member 23. Screw member 23 is in turn connected to nut gear 24 adapted to be driven by gear 25 attached to the shaft of motor 26. Nut gear 24 also drives gear 27 which in turn drives the shaft of potentiometer 28 adapted to yield a voltage proportional to the rotation of its shaft. Screw member 23 is restrained in its longitudinal movement, as shown in Fig. 2, by means of switch contacts 29 and 30 which are designed to open when screw member 23 exceeds the desired limits of motion. Static air pressure from a pitot-static head is introduced to sensitive bellows 2 through solenoid valve 31 and conduit 32. Solenoid valve 31 is connected to be operated intermittently at the will of a human operator or as specified by other mechanisms. Static air pressure from the same source is also admitted constantly without any valving action to the area within casing 1 outside of sensitive bellows 2 by means of conduit 33. This static pressure is also admitted to the area between bellows 16 and 21. Approximate static air pressure from any convenient source is also admitted by conduit 34 to the area outside bellows 21 but inside casing 1. This section of casing does not communicate with the section which encloses sensitive bellows 2.

In operation, static air pressure at the altitude at which the instrument happens to be is admitted through conduit 33 constantly. Static air therefore fills the space between casing 1 and sensitive bellows 2 as well as between bellows 16 and outer bellows 21. Static air pressure from any convenient source is admitted through conduit 34 to the space outside outer bellows 21. The pressure admitted through conduit 34 to the space between outer bellows 21 and casing 1 has no effect upon the operation of this invention. The function of bellows 21 is to form a pressure seal around bellows 16. Without bellows 21 a pressure seal around screw member 23 would be necessary. If valve 31 is in open condition, static air pressure is also admitted to the interior of sensitive bellows 2 and bellows 16. To measure a change in altitude, valve 31 is closed, trapping static air at the reference altitude within bellows 16 and sensitive bellows 2. If the altitude of the device is therefore changed, the static air pressure outside sensitive bellows 2 and between bellows 21 and bellows 16 also changes. Assuming for the moment an increase in such static pressure indicating a descent in altitude, it is apparent from Fig. 1 that bellows head 3 will move to the left in Fig. 1, causing capacitor plate 4 to approach capacitor plate 7 and recede from capacitor plate 6. This movement generates an electrical signal which is amplified and used to drive motor 26 which in turn drives nut gear 24 in the direction required to advance screw member 23 to the right so as to compress the air within inner bellows 16. This movement continues until the pressure within bellows 16 and 2 is equal to that outside bellows 2, at which point capacitor plate 4 is again centered between capacitor plates 6 and 7, thus generating no signal. The null point of the device, it can therefore be seen, may be arbitrarily set at any pressure altitude where valve 31 is closed. The extent to which the air within bellows 16 and 2 must be compressed is accurately recorded by potentiometer 28 driven by gear 27 from nut gear 24. In order that the volume change incident to increasing the pressure within bellows 2 and 16 may be an accurate measure of the pressure altitude change, the air therein must be compressed isothermally. To assure this condition, bellows 2 contains porous cup 12 filled with high heat capacity porous material such as metal shavings or metal screening. In addition, bellows 16 contains two series of nested cups of high heat capacity material which prevent any substantial change in the temperature of the air within these bellows.

If the pressure altitude is increased, thus decreasing the local static air pressure, a similar analysis to that indicated above is applicable, except that the pressure upon the enclosed sample of air is decreased by the turning of motor 26 in the opposite direction. Switch contacts 29 and 30 in series with motor 26 are provided in order that the motion of screw member 23 may be limited to correspond to the limits of rotation of potentiometer 28. Lever 10 and adjustable counterweight 11 are provided in order that the instrument may be operated in any angular position without acceleration effects.

Figure 4:
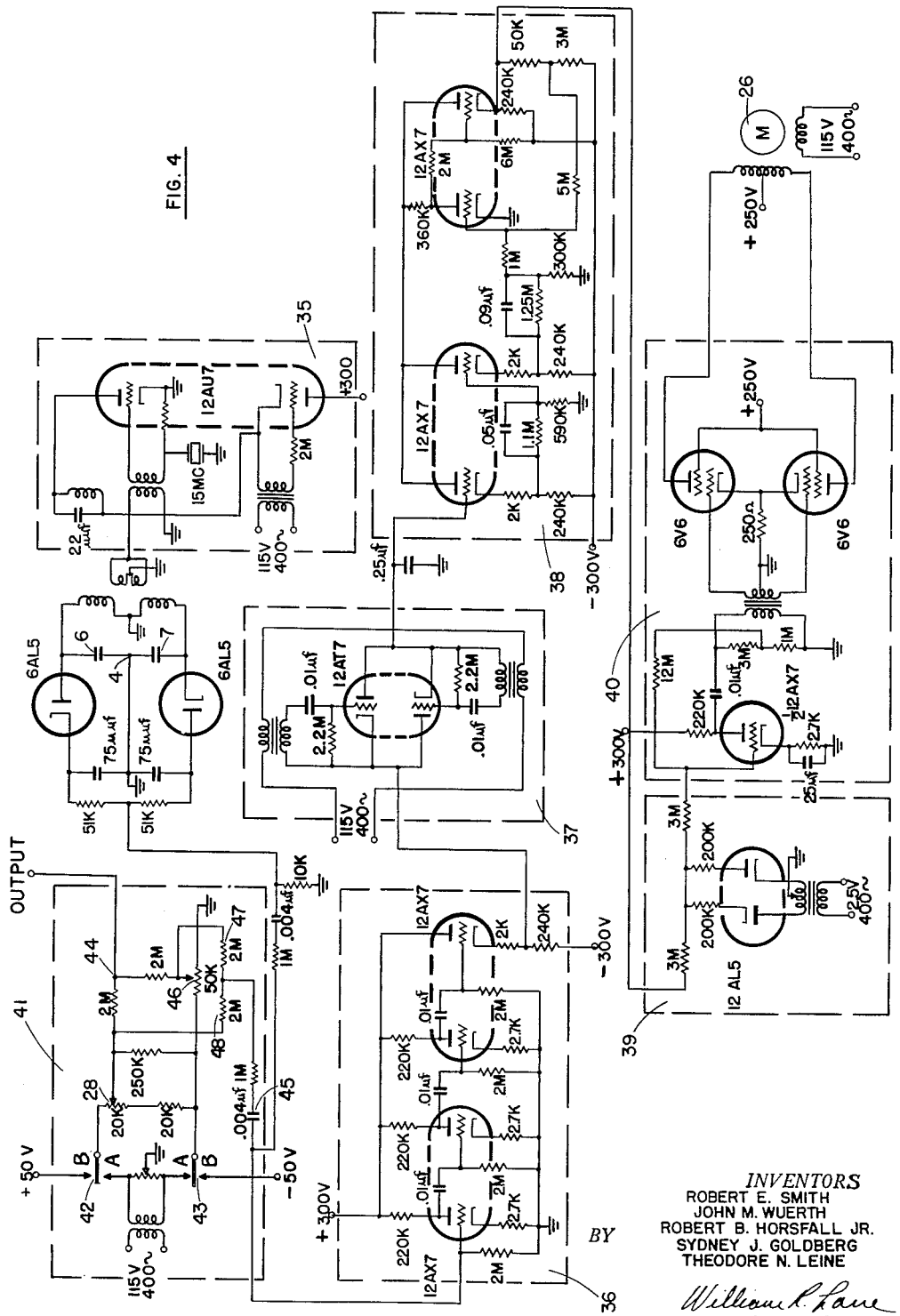
Fig. 4 is a circuit diagram of the invention.

Referring now to Fig. 4 there is shown the circuit connection which controls the rotation of motor 26 in response to the output of capacitor plates 6 and 7. Oscillator 35 furnishes a very high frequency alternating current signal to plates 6 and 7. Movement of capacitor plate 4 from a centered position between plates 6 and 7 causes the generation of an alternating current signal whose phase indicates the direction of movement of plate 4, and whose magnitude indicates the amount of the movement of plate 4. This signal is amplified in alternating current amplifier 36 from which it is fed to demodulator 37 which converts the alternating current signal into a direct current signal. This direct current signal is then stabilized in servo equalizer 38 and modulated by modulator 39 whose output is an alternating current signal. This alternating current signal is amplified in amplifier 40 which drives motor 26.

Reset network 41 is provided for the purpose of repositioning potentiometer 28 and screw member 23 to their initial positions after the device has been used to determine a given altitude difference. Switches 42 and 43 are set in position B when the device is to be operated to measure a difference in altitude, and in position A when it is desired to reset the device. Switches 42 and 43 are single-pole, double throw switches which, when in position B, supply a reference voltage for potentiometer 28, the output of which is taken from terminal 44. This output is prevented from entering the pickoff by capacitance 45 when switches 42 and 43 are in position B. When a given measurement is completed, switches 42 and 43 are placed in position A, supplying alternating current to the reset network. Since, at the end of any given measurement, potentiometer 28 is displaced by a certain amount, an A. C. voltage will be supplied to capacitance 45 from which it is fed to amplifier 36 and eventually to motor 26 to turn it in the direction required to bring potentiometer 28 back to its initial position. As soon as potentiometer 28 reaches its initial position no further signal is passed because the negative voltage supplied through variable resistance 46 and fixed resistance 47 exactly balances the positive voltage supplied through potentiometer 28 and fixed resistance 48. The device is then in condition for another measurement performed in precisely the same manner as previously described.

Figure 3:
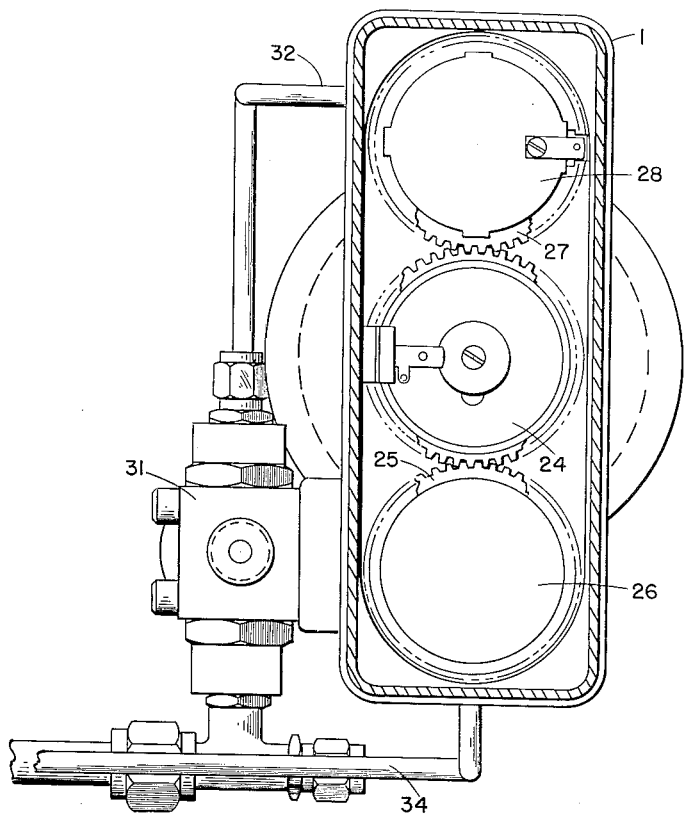
Fig. 3 is a side view of the invention.

If the pressure difference to be measured exceeds approximately 5% of the pressure altitude, the embodiment of the invention shown in Fig. 5 has some advantages over that shown in Figs. 1, 2 and 3. The device shown in Fig. 5 is broadly similar to that shown in Figs. 1, 2 and 3 except that instead of employing a second bellows to compress the trapped air, a piston is used. In Fig. 5 static air is admitted intermittently through conduit 49 to the interior of sensitive bellows 50 which actuates bellows head 51 mechanically connected to capacitor plate 52 which is centered between capacitor plates 53 and 54. Perforated cylinder 55 within bellows 50 is provided as a means for effecting the isothermal compression of the air entrapped in the bellows, and piston member 56 slides in sealing engagement along guides 57 and 58. Piston member 56 is integrally attached through screw member 59 which may be driven longitudinally by nut gear 60 which meshes with gear 61 driven by motor 62. Nut gear 60 also engages gear 63 which drives potentiometer 64. Spring 65 assures that no longitudinal movement of piston 56 occurs without a corresponding turning of nut gear 60. It can be seen that motor 62 corresponds to motor 26 of Fig. 1; potentiometer 64 corresponds to potentiometer 28 of Fig. 1 in over-all effect. The advantage of the configuration shown in Fig. 5 is that the air within bellows 50 may be more highly compressed than is the case with the device shown in Fig. 1. Consequently, a greater differential pressure altitude may be measured than with the device shown in Fig. 1.

Although the invention has been described and illustrated in detail, it is to be clearly understood that the same is by way of illustration and example only and is not to be taken by way of limitation, the spirit and scope of this invention being limited only by the terms of the appended claims.

We claim:

1. Means for measuring changes in pressure altitude comprising a gas tight container open to static air pressure, a bellows within said container, a pickoff for generating an electrical signal responsive to movement of said bellows, valve means for admitting static air pressure to said bellows, heat absorbent material having a high ratio of surface area to volume within said bellows, and compressor means responsive to said electrical signal for changing the pressure within said bellows isothermally to equal the pressure between said bellows and said container when said valve is closed whereby the change in the volume of said bellows is a measure of changes in pressure altitude to which said container is subjected.

2. A device as recited in claim 1 and further comprising pickoff means for indicating the volume change produced by said compressor means to thereby indicate pressure altitude changes of said container.

3. Altitude difference measuring means comprising a container open to the atmosphere, a closed variable volume chamber within said container, said chamber being adapted to vary its volume in correspondence with the difference between the pressure therein and the pressure in said container, capacitive pick-off means normally maintained in a null position and responsive to variations in volume of said chamber to generate an electrical signal, valve means for admitting static pressure to said chamber, heat absorbent means having a high ratio of surface area to volume within said chamber, and means responsive to said electrical signal for changing the volume of said chamber when said valve is closed in a manner to restore said capacitive pick-off means to said null position whereby if said container is subjected to pressure altitude changes while said valve is closed, said volume change is a measure of the change in said pressure altitude.

4. Pressure altitude responsive means comprising a container open to the atmosphere, a bellows having a bellows head within said container, pickoff means adapted to yield an electrical signal proportional to the displacement of said bellows head, means for varying the pressure of the air within said bellows in response to signals of said pickoff means, valve means for admitting static pressure to said bellows, heat absorbent material having a high ratio of surface area to volume within said bellows, and pickoff means for indicating the response of said pressure varying means to thereby indicate changes in pressure altitude to which said container is subjected while said valve is closed.

5. Means for measuring changes in pressure altitude comprising a rigid container open to the atmosphere, a closable chamber within said container, pressure responsive means associated with said chamber for generating an electrical signal in response to differences between the pressure in said container and the pressure in said chamber, means for changing the volume in said chamber in response to said electrical signal, a material having a high heat capacity positioned within said chamber, and pickoff means for generating an electrical signal in response to motion of said volume-changing means whereby if said closable chamber is closed and said container is then subjected to a change in pressure altitude, the signal generated by said pickoff means is a measure of said change in pressure altitude.

6. A device as recited in claim 5 in which said chamber comprises a collapsible bellows in which said pressure responsive means comprises a bellows head and a capacitance pickoff for producing an electrical signal proportional to the motion of said bellows head and in which said volume-changing means comprises a second bellows, a second bellows head, a motor drivable in response to said electrical signal, and mechanical means for moving said second bellows head in response to rotation of said motor.

7. A device as recited in claim 5 in which said chamber comprises a bellows in which said pressure responsive means comprises a bellows head and a capacitance pickoff for producing an electrical signal proportional to the motion of said bellows head and in which said volume-changing means comprises a cylindrical sleeve extending into said chamber, a piston within said sleeve, and a motor mechanically connected to drive said piston in response to said last-named electrical signal.

8. Means for measuring changes in pressure altitude comprising a rigid container open to the atmosphere, a closable chamber within said container, said chamber being adapted to vary its volume in correspondence with the difference between the pressure therein and the pressure in said container, pressure responsive means associated with said chamber for generating an electrical signal in response to variations in volume of said chamber, means for changing the volume in said chamber in response to said electrical signal, a predetermined quantity of metallic heat absorbent material within said chamber, and pickoff means for generating an electrical signal in response to motion of said volume-changing means whereby if said closable chamber is closed and said container is then subjected to a change in pressure altitude, the signal generated by said pick-off means is a measure of said change in pressure altitude.

9. Means for measuring changes in pressure altitude comprising a rigid container open to the atmosphere, a bellows within said container, a bellows head on said bellows, a capacitance pickoff for generating an electrical signal in response to motion of said bellows head, a valve for admitting atmosphere pressure to said bellows, a second bellows communicating internally with said first-named bellows, a motor rotatable in response to the electrical signal generated by said pickoff, mechanical means for moving said second bellows in response to rotation of said motor, a mass of heat absorbent material having a high heat capacity positioned within said bellows for assuring isothermal expansion and compression of the gases therein, and a potentiometer driven by said motor whereby if said valve is closed and said container thereafter experiences a change in pressure altitude, the voltage output of said potentiometer is a measure of said change in pressure altitude.

References Cited in the file of this patent

UNITED STATES PATENTS

| | | |
|---|---|---|
| 2,412,541 | Shivers | Dec. 10, 1946 |
| 2,463,585 | Young | Mar. 8, 1949 |
| 2,484,541 | Allwein | Oct. 11, 1949 |
| 2,507,326 | Wehrlin et al. | May 9, 1950 |
| 2,567,253 | Strange et al. | Sept. 11, 1951 |
| 2,598,681 | Garbarini et al. | June 3, 1952 |
| 2,618,157 | Keeling, Jr. | Nov. 18, 1952 |
| 2,646,682 | Ovtschinnikoff | July 28, 1953 |

FOREIGN PATENTS

| | | |
|---|---|---|
| 674,309 | Germany | Apr. 12, 1939 |
| 878,475 | France | Oct. 12, 1942 |
| 938,365 | France | Apr. 5, 1948 |